US006093488A

United States Patent [19]
Torrey

[11] Patent Number: 6,093,488
[45] Date of Patent: Jul. 25, 2000

[54] NON-WOVEN CEILING PANELS OF FORMED THERMOPLASTIC COMPOSITIONS

[75] Inventor: Bruce M. Torrey, Pittsfield, Mass.

[73] Assignee: General Electric Company, Pittsfield, Mass.

[21] Appl. No.: 08/162,741

[22] Filed: Dec. 3, 1993

[51] Int. Cl.[7] .......... B32B 5/16

[52] U.S. Cl. .......... 428/332; 428/113; 428/327; 428/339; 428/364; 52/473; 52/721.1

[58] Field of Search .......... 428/364, 339, 428/319.7, 332, 113, 286, 318.4, 319.3, 325, 327, 920, 921; 264/DIG. 19; 98/400.05, 40.1, 40.12, 40.19; 52/473, 721

[56] References Cited

U.S. PATENT DOCUMENTS

| | | | |
|---|---|---|---|
| 3,791,969 | 2/1974 | Patil . | |
| 3,999,040 | 12/1976 | Ellis | 219/543 |
| 4,296,733 | 10/1981 | Saunders . | |
| 4,328,926 | 5/1982 | Hall, Jr. . | |
| 4,428,306 | 1/1984 | Dresen et al. . | |
| 4,443,258 | 4/1984 | Kirkhuff . | |
| 4,470,342 | 9/1984 | Hall, Jr. . | |
| 4,693,174 | 9/1987 | Anderson | 98/40.05 |
| 4,716,072 | 12/1987 | Kim . | |
| 5,044,138 | 9/1991 | Zaccardelli et al. | 52/667 |
| 5,145,625 | 9/1992 | Dotzauer et al. | 264/109 |
| 5,153,058 | 10/1992 | Hall et al. . | |
| 5,247,901 | 9/1993 | Landon et al. | 119/15 |

FOREIGN PATENT DOCUMENTS

| | | |
|---|---|---|
| 148760 | 7/1985 | European Pat. Off. . |
| 148761 | 7/1985 | European Pat. Off. . |

*Primary Examiner*—Merrick Dixon

[57] ABSTRACT

A ceiling panel is provided which employs a systems approach involving ducting for ventilation, lighting and optionally sprinklers. The ceiling panel is made from a thermoplastic deposit material containing inorganic fibers which are held in compression by thermoplastic matrix material. The thermoplastic composite exhibits the desired electrical insulative, fire resistant, reduced weight, and economic properties for the ceiling panel. The ceiling panel provides a systems approach combining the desired features associated with ceilings, namely, ventilation, lighting and sprinkler systems, while employing a material that exhibits the desired properties of electrical insulation, fire resistance and low weight.

12 Claims, 2 Drawing Sheets

NON-WOVEN CEILING PANELS OF FORMED THERMOPLASTIC COMPOSITIONS

BACKGROUND OF THE INVENTION

1. Field of the Invention

The present invention relates to ceiling panels, and more particularly relates to ceiling panels which employ a systems approach combining ventilation and lighting functions, and optionally sprinkler functions.

2. Description of the Related Art

Panels employing a systems approach are known, however, the materials such as metal and wood and unreinforced plastic have exhibited undesired properties when in use. Specifically, such materials were found lacking in either one or more of the following characteristics, namely, electrical insulative properties, fire resistance, weight, or fabrication costs. Consequently, there is a desire to provide ceiling panels which employ a systems approach, and which have the combined properties of electrical insulation, fire resistance, low weight and low fabrication costs.

SUMMARY OF THE INVENTION

The present invention provides a ceiling panel which employs a systems approach, which has a ceiling member that employs a thermoplastic composite which comprises a thermoplastic matrix material and inorganic fibers, preferably glass fibers, which are held in compression by the thermoplastic matrix, and which upon exposure to excessive heat results in the melting of the thermoplastic matrix and the lofting of the inorganic fibers, resulting in a lofted inorganic fiber layer which resists fire penetration.

DESCRIPTION OF THE PREFERRED EMBODIMENT

Figure 4:
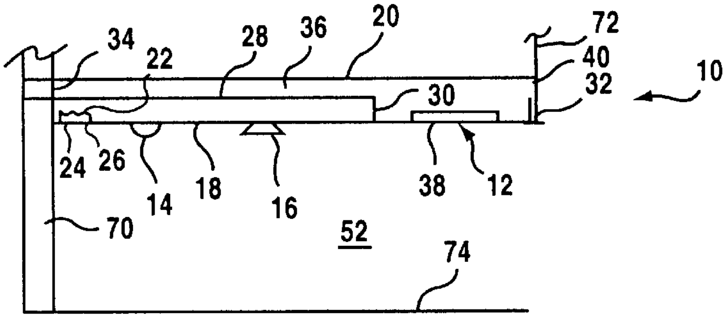
FIG. 4 is a side horizontal view of a ceiling panel according to the present invention.
Figure 5:
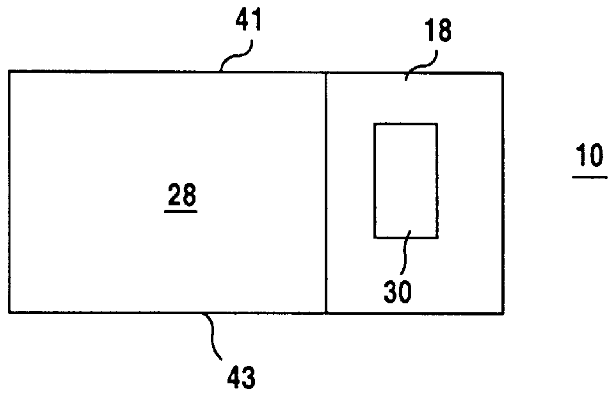
FIG. 5 is a top plan view of a ceiling panel according to the present invention, wherein the upper ducting wall has been removed.

Referring particularly to FIGS. 4 and 5, the ceiling panel (10) is a system which comprises a ventilation unit (12), a lighting unit (14) and optionally a sprinkler unit (16). The panel (10) has a ceiling member (18) which is preferably in the form of a flat horizontal rectangular sheet, and which is made of a thermoplastic composite material. The panel further has an upper ducting wall (20) which is parallel to the ceiling member (18) and which is spaced apart, above the ceiling member (18). Optionally the panel (10) may have channel tracks (22) for holding electrical wires (24) for powering the lighting unit (14), and for holding the water lines (26) for operating the sprinkler units (16).

Figure 6:
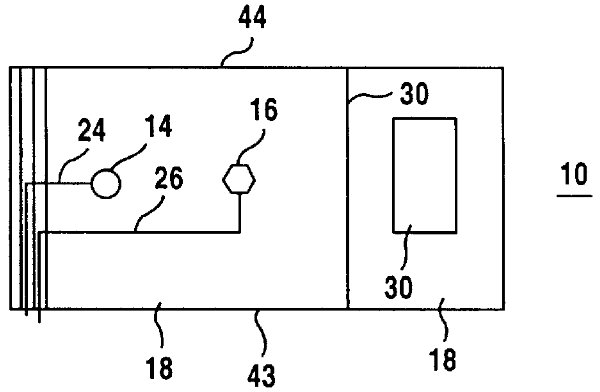
FIG. 6 shows a top plan view of the ceiling member having a lighting unit, a sprinkler unit, and a ventilation unit, wherein the upper ducting wall and the lower ducting wall have been removed.

As shown in FIG. 6, the tracks (22) can hold the electrical wires (24) for powering the lighting unit (14), and the tracks (22) can hold the water lines (26) for powering the sprinkler unit (16). The tracks are preferably present in the panels of the present invention, but are not absolutely required therein. Preferably the lighting unit (14) and the sprinkler unit (16) are separated from the ventilation unit (12) by a lower ducting wall (28) located between the upper ducting wall (20) and the ceiling member (18), and parallel thereto. The lower ducting wall (28) is preferably the same width as the ceiling member (18) and the upper ducting wall (20), but is preferably shorter than both, and extends from one end of the panel (10) to a distance short of the other end of the panel (10), and has a first vertical ducting wall (30) extending from the second end of the lower ducting wall (28) down to the ceiling member (18). A second vertical ducting wall (32) extends vertically from the far end of the ceiling member (18) up to the height of the lower ducting wall (28). The upper ducting wall (20), the lower ducting wall (28), the first vertical ducting wall (30) and the second vertical ducting wall (32) define a ventilation chamber (36) for the flow of air from an inlet (34) through the chamber (36) and out of the outlet (38) and optionally also out of the communication port (40). Vertical side walls (41), (43) may be employed to further define the chamber (36), and may extend from opposite sides of the upper duct wall (20) down to the ceiling member (18).

Figure 7:
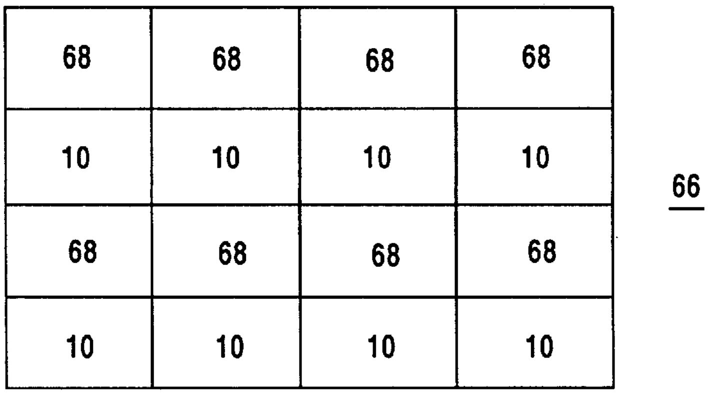
FIG. 7 illustrates a bottom plan view of a ceiling which has numerous ceiling panels placed adjacent to each other to form a ceiling.

As illustrated in FIG. 7, the ceiling panels (10) may be interconnected to cover the entire ceiling of a room, and provide alignment of the tracks (22) to allow for wiring (24) and water lines (26) to run from panel to panel, and to allow the communication port (40) of one panel to be aligned adjacent to and in gaseous communication therewith an inlet (34) of an adjacent panel to permit air flow from panel to panel in order to facilitate ventilation of the room.

Figure 1:
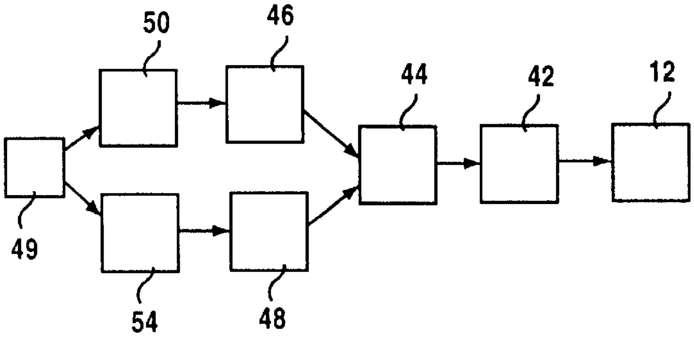
FIG. 1 is a schematic representation of a heating-ventilation-air conditioning system which is in communication with the ventilation unit of the ceiling panel of the present invention.
Figure 2:
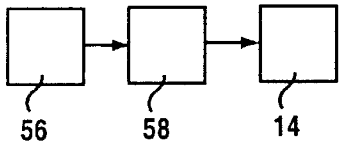
FIG. 2 is a schematic representation of an electrical lighting system which is in cooperation with the lighting unit of a ceiling panel according to the present invention.
Figure 3:
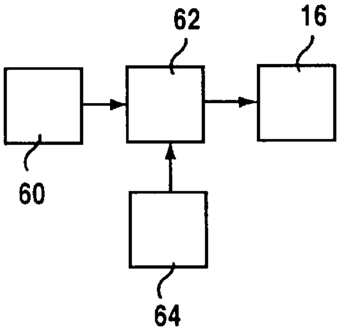
FIG. 3 is a schematic representation of a sprinkler system which is in cooperation with the sprinkler unit of a ceiling panel of the present invention.

As previously mentioned, system approaches to ceiling panels are known, and thus the figures herein serve as illustrations of ceiling panel systems, but the critical element of the present invention is the employment of an inorganic fiber reinforced thermoplastic composite which exhibits the desired property profile as set out above. As set out in the schematics of FIGS. 1, 2, and 3, the ventilation unit (12) of the ceiling panel (10), is in communication with a branch duct (42) which is in further communication with a main duct (44). Main duct (44) is in gaseous communication with a heating unit (46) and an air conditioning unit (48). A blower (50) is motor driven to force pressurized air through heating unit (46) into main duct (44) further into branch duct (42) into inlet (34) then in the chamber (36) (which is in gaseous communication with the inlet (34), and out of outlet (38) to heat a room (52). Similarly, blower (54) is motor driven to force pressurized air through air conditioning unit (48) into main duct (44) into branch duct (42) and then into inlet (34), into chamber (36) and through outlet (38) to cool the room (52). The air conditioning unit (48) and heating unit are activated by a thermostat (49).

Lighting unit (14) receives electricity from electrical source (56), and the flow of electricity to lighting unit (14) is controlled by switch (58).

Sprinkler unit (16) receives pressurized water from water source (60), and the flow of water from water source (60) to sprinkler unit (16) is controlled by a flow control valve (62) which is open by a triggering mechanism (64) which may be actuated in response to heat and/or smoke.

As shown in FIG. 4 the lighting unit (14), sprinkling unit (16) and ventilation unit (12) may all be incorporated into ceiling panel (10) which may be then used as a portion of the entire ceiling (66). The ceiling (66) may be covered in whole or in part with the ceiling panels (10) of the present invention, optionally in combination with simple ceiling tiles (68) which do not comprise ventilation units, lighting units, or sprinkling units.

As illustrated in FIG. 4, the ceiling panel (10) can be attached to a wall stud (70) of a building at one end and supported at the other end by a vertical wire support (72) as is done for conventional ceiling tiles. The wall stud (70) rises vertically from the floor (74) of the room (52), and the ceiling panels (10) are spaced there above, preferably about 8 feet thereabove, in parallel relationship thereto. The branch duct (42) is in direct communication with the inlet (34) of the chamber (36) to supply air thereto, and to supply air to the room (52) by forcing air into the inlet (34), through the chamber (36), through the outlet (38) and into the room (52). Water lines (26) supply water to the sprinkler unit (16) in order to put out any fires which may occur in the room (52). Electrical wires (24) supply electricity to lighting unit (14) to provide light for the room (52). The critical feature of the present invention is the use of a specific type of thermoplastic composite in order to provide a material for the ceiling panel which exhibits desired properties of electrical insulation, fire resistance, light weight, and low cost.

The ceiling panel is preferably shaped from a composite sheet having (i) reinforcing fibers, preferably reinforcing inorganic fibers, preferably having lengths of from 0.1 to 2.0 inches, wherein the fibers are present in the composite at a level of from 30% to 70% by weight based on the total weight of the composite, and (ii) a thermoplastic matrix material preferably present at a level of from 30% to 70% by weight based on the total weight of the composite. Optionally, the composite is made by using a continuous strand fiber, and is optionally made by impregnating a fiber glass web with a melted thermoplastic material and allowing the material to cool under compression to solidify the composite.

The composite is preferably obtained by a process which involves (1) an aqueous medium, preferably (2) a binder, usually at least partially in the form of a latex which contains either anionic or cationic bound charges, (3) a heat-fusible organic polymer which is in particulate form, (4) reinforcing fibers, and (5) optionally a flocculent.

In the process, a dilute aqueous slurry is prepared containing the acqueous medium, the heat fusible organic polymer particulates and the reinforcing fibers. The slurry is agitated and then uniformly distributed onto a porous support and is allowed to drain to form a wet mat, the wet mat is optionally passed through press rolls and then dried, such as passing the wet mat through a series of heated dryer rolls to obtain a dried mat which optionally is rolled onto a cylinder or collected as a flat sheet stock which is then stamped or thermoformed at an elevated temperature into the desired shaped thermoplastic composite structure. The dried mat may then be subjected to various kinds of treatment for the intended use such as compression molding the dried mat to fuse the organic polymer particulates and thereby form the composite structure. The composite preferably has a thickness between 0.25 and 1.0 inch (although thinner cross sections are also possible), and preferably has a rectangular shape having a width between 1 foot and 4 feet, and a length between 1 foot and 8 feet. Optionally, a binder material is employed in the dilute aqueous slurry and the solids are flocculated during agitation with a polymeric flocculent having an opposite charge to that of the latex binder. Suitable binders and flocculents are set forth in Wessling et al., U.S. Pat. No. 4,426,470 issued Jan. 17, 1984 which is incorporated herein by reference. Suitable latexes which can be used in the present invention include those described in U.S. Pat. No. 4,056,501, issued Nov. 1, 1977, to Gibbs et al., incorporated herein by reference.

The invention requires a normally solid, heat fusible organic polymer which will form the thermopolastic matrix material. By "heat fusible" is meant that the polymer particles are capable of deformation under heat to join into an unitary structure. The heat fusible polymers are preferably thermoplastic resins. The heat fusible organic polymer component of the present invention is desirably a hydrophobic, water-insoluble addition polymer. These polymers are in particulate form and may be in the form of a powder or a dispersion. Suitable heat fusible organic polymers include addition and condensation polymers such as, for example, polyethylene; ultra high molecular weight polyethylene; chlorinated polyethylene; bipolymers of ethylene and acrylic acid; polypropylene; polyamides, polycarbonates; phenylene oxide resins; phenylene sulfide resins; polyoxymethylenes; polyesters such as polyethylene terephthalate and polybutylene terephthalate; graft polymers of acrylonitrile, butadiene and styrene; polyvinylchloride; bipolymers of a major proportion of vinylidene chloride and a minor proportion of at least one other alpha,beta-ethylenically unsaturated monomer copolymerizable therewith; and styrene homopolymers or copolymers. The polymer particulates generally and advantageously have a particle size in the range of 1 to 400 microns. The polymers are generally employed in the composite structure an amount of from 20% to 90% by weight based on the total weight of the composite structure and more preferably at a level of from 30% to 70% by weight thereof. A particularly preferred organic polymer is a polyolefin powder when such polymer has been prepared by the process of U.S. Pat. No. 4,323,531. Of course, blends of polymers may be used. The polymer may be a material such as bisphenol A polycarbonate resin. Optionally, the matriax material may be recycled plastic.

The reinforcement fibers include inorganic materials such as graphite, metal fibers and glass fibers, but preferably and advantageously comprises glass fibers such as chopped glass strands having a length of ⅛ to 1 inch (about 3.2 to 25.4 mm), milled glass fibers which generally have a length of about 1/32 to ⅛ inch (about 0.79 to 3.2 mm) and mixtures thereof. The glass fibers are advantageously heat cleaned and, to improve impact properties, such fibers may be compatibilized by having a thin coating of, for example a polyolefin resin or starch thereon. The fibers are preferably surface treated with chemical sizing or coupling agents which are well known in the art. The reinforcing material generally comprises from 10 to 80 weight percent based on the total weight of the thermoplastic composite structure, and more preferably 30 to 70 percent by weight thereof.

The reinforcing fiber used in the composites of the present invention preferably have at least 95% by weight of said fibers having lengths of less than 2 inches, more preferably less than 1.5 inches, and even more preferably less than 1.1 inch.

The composite sheets of the invention may also, optionally, contain a variety of other ingredients. Minor amounts, for example, 10–33% by weight, of fillers such as silicon dioxide (Novacite), $CaCO_3$, MgO, $CaSiO_3$ (wollastonite) and mica may be incorporated in the mat of composite sheets of this invention if desired. Pigments or dyes may be added to impart opacity and/or color.

The thermoplastic composite structures are formed by blending the heat-fusible polymer particulates, the reinforcing material, and the water, agitating to form a slurry, dewatering to form a continuous mat, drying, and applying heat and pressure to the mat to melt the thermoplastic resin.

This method for making the composite is conveniently and preferably carried out by first stirring the reinforcing material in water until it is uniformly dispersed, then slowly adding the heat-fusible polymer, and stirring the materials throughout this portion of the process. This slurry of water, heat-fusible polymer, reinforcing material and optionally latex binder and flocculent preferably has a total solids content of 0.01 to 5% solids by weight, and more preferably 0.02 to 0.5% solids by weight based on the total weight of the slurry.

The composite structure making process may be accomplished by any conventional paper making apparatus such as a sheet mold or a Fourdrinier or cylinder machines.

After the mat is formed into a dewatered mat, it may be desirable to densify the mat by pressing it with a flat press or by sending it through calendering rolls. Densification after drying of the mat is particularly useful for increasing the tensile and tear strength of the mat. Drying of the mat may be either air drying at ambient temperatures or oven drying.

I claim:

1. A ceiling panel comprising:

a) a ceiling member consisting of a thermoplastic composite sheet comprising (i) reinforcing inorganic fibers having lengths of from 0.1 to 2.0 inches, said fibers being present in said composite at a level of from 10% to 80% by weight based on the total weight of the composite sheet, and (ii) a thermoplastic matrix material present at a level of from 20% to 90% by weight based on the total weight of the composite sheet, said fibers being held in compression by said thermoplastic matrix material, b) a ventilation unit comprising (i) an air inlet that is connectable to a source of pressurized air, (ii) an air chamber in gaseous communication with said air inlet for air flow from said inlet into said chamber, and (iii) an air outlet located in said ceiling member and in gaseous communication with said chamber for air flow from said chamber through said outlet, and c) a lighting unit attached to said ceiling member.

2. The ceiling panel of claim 1 wherein said panel further comprises a sprinkler unit.

3. The panel of claim 1 wherein said panel has channel tracks attached to said member for holding electrical wires.

4. The panel of claim 1 wherein said composite has a thickness of between 0.25 and 1.0 inches.

5. The panel of claim 1 wherein said thermoplastic matrix material is a polyolefin resin.

6. The panel of claim 5 wherein said polyolefin is polypropylene.

7. The panel of claim 1 wherein said composite consists essentially of said fiber and said material.

8. The panel of claim 1 wherein said fiber is glass fiber.

9. A ceiling panel comprising:

a) a ceiling member, b) an upper ducting wall spaced apart from said ceiling member and parallel therewith, c) a lower ducting wall spaced between said upper ducting wall and said ceiling member and being parallel therewith, said upper ducting wall and said lower ducting wall forming a ventilation chamber therebetween, d) a lighting unit attached to said member, e) an air inlet in gaseous communication with said chamber for receiving pressurized air from an air duct, f) an air outlet located in said member in gaseous communication with said chamber for allowing air to pass from said chamber through said outlet, g) said ceiling member consisting of a flat thermoplastic composite rectangular sheet comprising non-woven inorganic fibers and a thermoplastic matrix material, said fibers being held in compression by said thermoplastic matrix material.

10. The panel of claim 9 wherein a vertical ducting wall extends perpendicularly between said ceiling member and said lower duct wall and separates said outlet from said lighting unit.

11. The panel of claim 1 wherein said sheet has said reinforcing fibers at a level of from 30 to 70 percent by weight based on the total weight of the composite sheet, and said thermoplastic matrix material is present at a level of from 30 percent to 70 percent by weight based on the total weight of the composite sheet.

12. The panel of claim 9 wherein said sheet has said reinforcing fibers at a level of from 30 to 70 percent by weight based on the total weight of the composite sheet, and said thermoplastic matrix material is present at a level of from 30 percent to 70 percent by weight based on the total weight of the composite sheet.

* * * * *